United States Patent [19]
Andrew et al.

[11] Patent Number: 5,881,205
[45] Date of Patent: Mar. 9, 1999

[54] VIDEO IMAGE PROCESSING TO PRODUCT RECORDED MEDIA

[75] Inventors: Derek Andrew, Charlwood, United Kingdom; Ian S. Fagg, Redmill, England

[73] Assignee: U.S. Philips Corporation, New York, N.Y.

[21] Appl. No.: 608,264

[22] Filed: Feb. 28, 1996

[30] Foreign Application Priority Data

Mar. 3, 1995 [GB] United Kingdom ................ 9504307.1

[51] Int. Cl.⁶ ............................ H04N 5/76; H04N 5/253; H04N 9/47
[52] U.S. Cl. ........................ 386/129; 386/131; 348/441; 348/96; 348/913
[58] Field of Search .................... 386/131, 1, 45, 386/46, 125–126, 109, 111, 112, 33, 129; 348/96, 97, 445, 449, 441, 474, 913, 911; H04N 5/76, 5/91, 5/92, 9/47

[56] References Cited

U.S. PATENT DOCUMENTS

| | | | |
|---|---|---|---|
| 5,243,433 | 9/1993 | Hailey | 348/240 |
| 5,280,351 | 1/1994 | Wilkinson | 358/140 |
| 5,307,171 | 4/1994 | Azuma et al. | 386/131 |
| 5,379,072 | 1/1995 | Kondo | 348/441 |
| 5,428,454 | 6/1995 | Kimura et al. | 386/131 |
| 5,576,950 | 11/1996 | Tonomura et al. | 386/121 |
| 5,594,552 | 1/1997 | Fujinami et al. | 386/131 |
| 5,654,747 | 8/1997 | Ottesen et al. | 348/12 |

FOREIGN PATENT DOCUMENTS

| | | |
|---|---|---|
| 428073 A2 | 5/1991 | European Pat. Off. . |
| 508342 A1 | 10/1992 | European Pat. Off. . |
| 514012 A2 | 11/1992 | European Pat. Off. . |
| 0571180 | 11/1993 | European Pat. Off. . |
| 0595323 | 5/1994 | European Pat. Off. . |
| 0598333 | 5/1994 | European Pat. Off. . |
| 0639029 | 2/1995 | European Pat. Off. . |
| 685968 A2 | 12/1995 | European Pat. Off. . |
| 2272816 | 5/1994 | United Kingdom . |

*Primary Examiner*—Thai Tran
*Attorney, Agent, or Firm*—Laurie E. Gathman

[57] ABSTRACT

A method and apparatus are provided for video signal processing of sequences of digitized images originating from video (10) or film. A field grabber (12) receives the digitized images from the input and identifies the separate fields thereof. An image manipulation stage (14) combines fields as required and reduces the number of pixels per line and pixel lines in each image by applying horizontal and vertical compression; this stage also provides filtering and resizing of the image as required. Following encoding (16) of the compressed images, the encoded data stream may then be processed (18) into a form for recording onto, for example, an optical disc. By appropriate choice of the number of lines to which the image manipulation stage (14) reduces the image, discs playable on either PAL or NTSC standard equipment may be produced from a single image source.

19 Claims, 1 Drawing Sheet

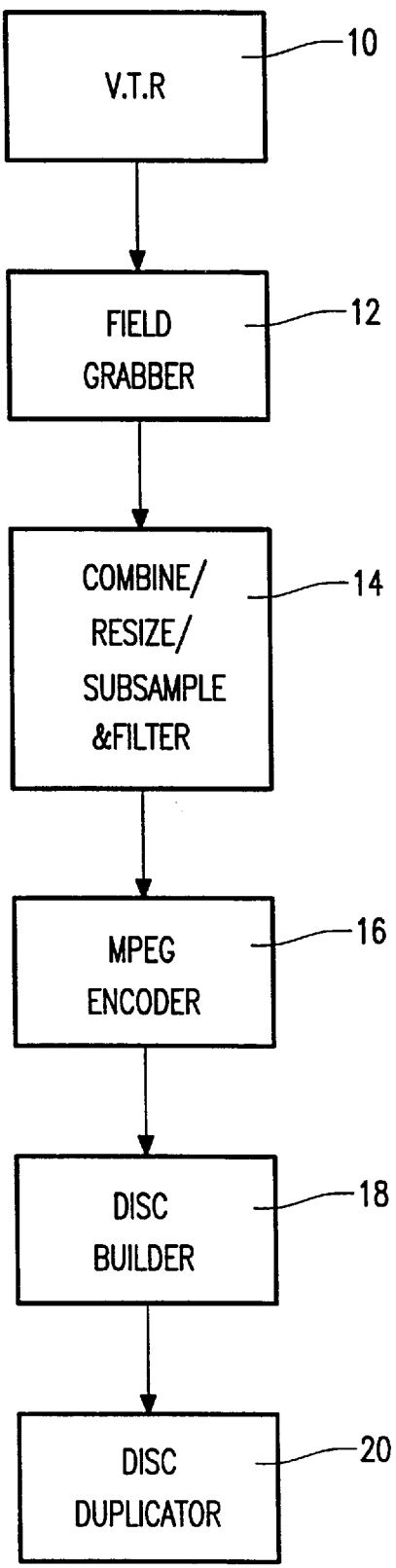

VIDEO IMAGE PROCESSING TO PRODUCT RECORDED MEDIA

BACKGROUND OF THE INVENTION

The present invention relates to methods of processing video signals and particularly, but not exclusively, to the processing of material originating from either 625 line 50Hz video or film camera in order to produce recorded media such as compact discs in different formats which can be played and displayed on either PAL or NTSC television equipment.

An example of a processing system for obtaining video images from stock using both high- and standard-definition telecine apparatus is given in European Patent Application EP-A-0595323 (Fujinami et al/Sony). The high-definition telecine is used to enable the production of a video signal with increased vertical resolution such as to be capable of display on a progressive scanning display. By a further process reducing the number of pixels, a standard-definition progressive scan signal is produced from which a standard-definition interlaced signal is generated.

A principal use for such systems is in the production of NTSC standard videos, optical discs, or other recorded media. According to conventional techniques, this requires a standards conversion process to produce a 525 line NTSC video tape from which the discs can be prepared. The cost of preparing the standards converted tape is typically in the region of US$15,000 for the material for one complete disc. One use for the system outlined above is in the conversion of music videos (which are often produced on film) to compact disc (CD) standards.

The problems of the differing requirements of the PAL and NTSC systems have long been recognised. Attempts to overcome them have included display systems with in-built standards conversion facilities as described in, for example, EP-A-0639029 (Lee/Goldstar) and U.S. Pat. No 5,280,351 (Wilkinson/Sony UK). Such options are presently unattractive, however, due to the high increased cost of the sets, which cost must be borne by the customer.

SUMMARY OF THE INVENTION

It is an object of the present invention to avoid the necessity of preparing an NTSC master when generating video from film source by the provision of a system operable to simultaneously produce, inter alia, two sets of images suitable for recording according to the Video Compact Disc standard (also known as the White Book standard), where one set is to be played on an NTSC standard player and the other on a PAL standard player.

It is a further object of the present invention to provide a system where the two sets of images may be obtained in a single pass through the original (master) image sequence.

In accordance with the present invention there is provided video signal processing apparatus having an input for receiving a sequence of digitised images from an image source, said apparatus comprising: field grabber means coupled to receive digitised images from the input, and operable to identify separate fields thereof and output an image frame as lines of pixel data; image manipulation means operable to apply horizontal and vertical compression to reduce the number of pixels per line and pixel lines in each image frame output by the field grabber, to numbers determined by a preselected display format; video encoding means arranged to receive the compressed image frames from the image manipulation means and encode them according to a predetermined coding standard.

Where the image source supplies an interlaced video signal, the field grabber means is preferably operable to grab both fields with the image manipulation means being operable to perform field combination with sub-sampling to produce the compressed image frames at substantially half the video signal field rate. In such circumstances, the image manipulation means is preferably operable to applying filtering when performing the field combination such as to reduce aliasing and to compensate for motion effects in the image fields. The image manipulation means may be further operable to perform image resizing by horizontal expansion of images: this resizing may alternatively, or additionally, be carried out by selection of a part of the image at the encoding stage.

Where the image source supplies images from film (i.e. the image source comprises telecine apparatus), the pairs of compressed image frames are again combined and the output is suitably produced at or close to the display frame rate of the film.

Also in accordance with the present invention there is provided a method of processing sequences of digitised images received from an image source, said method comprising the steps of:

grabbing the digitised images, identifying separate fields thereof and outputting an image frame as lines of pixel data;

reducing the number of pixels per line and pixel lines in each image frame to numbers determined by a preselected display format, by respectively applying horizontal and vertical compression; and encoding the compressed image frames according to a predetermined coding standard.

The predetermined coding standard may suitably be the MPEG1 or 2 standard, with the preselected display format being either NTSC or PAL standard.

Further in accordance with the present invention, there is provided a record carrier preferably, but not essentially, an optical disc, carrying encoded video images produced by the signal processing apparatus or method described above. Where the record carrier is an optical disc, the said predetermined recording format suitably complies with either the Compact Disc Interactive standard or the Video Compact Disc standard.

As will be understood, the above-described processes can be implemented either as a dedicated function or as options in equipment which performs grabbing, picture re-sizing and, where required, sub-sampling with appropriate filters. When operating in accordance with the present invention, the equipment can produce output intended for either PAL or NTSC display from the same source tape.

BRIEF DESCRIPTION OF THE DRAWINGS

Preferred embodiments of the present invention will now be described by way of example only and with reference to the accompanying drawing (FIG. 1) which is a block schematic diagram of a data processing system embodying the present invention.

BRIEF DESCRIPTION OF THE PREFERRED EMBODIMENTS

The processing of material originating from video for a disc intended for NTSC display includes the application of vertical squeezing to the picture to reduce the 625 line source to a near full screen image of 240 lines (which will be expanded in the player, typically by repetition of lines, to give 480 lines) with a resolution of 352 pixels per line. This squeezing can be applied by external digital effects video equipment or built into the grabber as part of the sub-sampling and filtering process. The picture sequence is then encoded as a near full screen 352 pixel by 240 line picture in accordance with the MPEG1 or 2 standard and at a picture rate of 25Hz. Advantage is then taken of the decoder frame store in a player to convert the display rate from 25 to 30Hz to provide an NTSC output.

For material originating from film, the picture sequence in the 625 line original may be the original 24 frame per second film speeded up to 25Hz. The process allows the MPEG encoded data stream to be time stamped at either 24 or 25 frame per second rate so that the rate may be slowed if desired. The audio must be treated appropriately to maintain synchronisation.

FIG. 1 is a block diagram of the apparatus in the processing chain, starting with video player 10 playing the master video tape (although it will be readily understood that this could be telecine apparatus providing images from frames of film). Whilst not shown, it will also be understood how the audio is treated although where special considerations apply, these are discussed below. Field grabber 12 separates the various fields of the video for analysis, for example to check for correct maintenance of the field dominance, and also to detect seam breaks due to editing, to avoid the combination of fields from different original images (such as from either side of a break) which would otherwise lead to blurred pictures. The separated fields are then passed to a frame processing unit 14 which handles combining, re-sizing, sub-sampling and filtering as required. If the master is film, this unit samples and filters as necessary to provide the fields for interlacing: if the master is video, different filtering will be required in order to compensate for motion effects. As to re-sizing, at least some will be carried out by this stage, although some may also be carried out externally, for example by window selection in the subsequent stage, MPEG encoder 16. The sub-sampling carried out at stage 14 reduces the picture to half size for coding in MPEG.

Following the conventional MPEG encoder 16, the disc builder 18 arranges the data according to the rules specified for the particular disc format chosen (for example the sector layout, audio handling and so forth) which data is then used for the production of discs by duplicator 20.

Considering now the differences between the Compact Disc Interactive and Video Compact Disc standards, generally known and referred to hereinafter as Green Book and White Book standards respectively, for video the differences include the fact that, in Green Book, with pictures encoded as blocks of 16×16 pixels, there is a limit on the number of blocks per frame. This is set at 396 blocks in constrained MPEG at 25Hz and 330 blocks at 30Hz. For 25Hz this allows near full screen sizes of 352×288=22×18=396 blocks 384×256=24×16=384 blocks 368×272=23×17=391 blocks.

In contrast, for White Book standard there are fixed picture sizes specified; 352×288 pixels for PAL at 25Hz and 352×240 pixels at 24 and 30Hz. A White Book PAL disc can be played on an NTSC display, although 48 lines are omitted to get the 240 specified with the cut generally (but not always) being 24 lines from each of the top and bottom. In such circumstances, these 48 redundant lines may simply be coded black, giving a "Cinemascope" appearance to the images when played on a PAL display.

The system provides temporal accuracy of image sequences throughout such that re-combination of video with audio is very straightforward. Unless there is a 24 to 25Hz increase in speed, the audio requires no treatment. If treatment of the audio is required, however, it is precisely predictable. The differing effects of the Green Book and White Book standards on the audio are as follows. The audio bit rate for Green Book is variable but for White Book is fixed at 224 k/bits per second—that is to say for a fixed duration sequence in White Book, a fixed number of audio bits are specified. Accordingly, if time stamps are added at 24Hz and it is desired to display at 25Hz, it is necessary to re-code the audio to get the correct bit rate. Time stamping at 25Hz, however, means that the whole sequence is speeded up (including audio) but no separate re-coding of the audio is required.

For White Book the audio rate is fixed at 224 k/bits per second with the video rate at 1.15 m/bits per second. For Green Book audio, there is no bit rate restriction as such, but the combined audio and video is constrained by the maximum rate that the data can be delivered from disc. Typical Green Book rates to satisfy this are audio at 192 k/bits per second with video at 1.186 m/bits per second.

A particular problem is with aspect ratio distortions for differing standards. A circle appearing on screen will appear squashed when displayed in White Book if Green Book standard is set, and squeezed in Green Book if White Book is set. A quoted figure is 11% required horizontal correction to be applied for Green Book standard (this is not generally a problem in White Book where the frequency corresponds to the VTR clock). Starting from the CCIR601 D1 clock VTR image, if we wish to grab for NTSC or PAL according to the White Book standard, we must cope with display rate and picture size changes. For Green Book standard, we also have to cope with aspect ratio changes.

In general we are looking to code White Book pictures with a fixed picture size for PAL at 25Hz and NTSC at 24 or 25Hz (generally 25HZ will be used for both), which gives the possibility of a 352×288 25Hz picture. In terms of data rates, this is acceptable for both. For picture size, this is acceptable for PAL but NTSC is dealt with as 240 lines plus 24 lines black above and below. This can then be displayed at 25Hz using White Book picture conversion mechanisms or we can extract the central 240 lines and code as 24 or 25Hz NTSC (this split is possible in the encoder which allows us to take a window from whatever input, that is to say ignoring the black).

The process of correction is split into parts through the stages shown in FIG. 1 and requires an initial determination as to whether the produced disc is to be White Book or Green Book standard.

The 11% stretch theoretically required for Green Book (as we are normally aiming at White Book) is produced as a 6% actual horizontal stretch together with a 4% vertical squeeze. The 11% figure is derived from the ratio of 15 to 13.5 MHz pixel clock rates and the 6% figure is derived from the ratio of 384 to 360 pixels, that is to say the ratio of the maximum permissible Green Book image width to full width (i.e. half the original 720 pixel width of the CCIR601 image) at desired image rates. The ratios allow expansion to maximize the picture area without losing detail from the edges.

The process for a disc intended for PAL display involves grabbing both fields of the input video and performing field combination with sub-sampling to reduce the data to typically 288 lines with a resolution of 352 pixels per line. In the case of Green Book format, the image is stretched in the horizontal direction to achieve correct aspect ratio in the final displayed image. The data is then encoded using a conventional MPEG 1 or 2 encoding scheme.

In the case where a 525 line NTSC master exists, rather than trying to get directly to PAL from NTSC, an original film frame would be re-created from the NTSC video by reversing the 3:2 pull down. The original film frame gives successive frames (in video) derived from the same instant, that is to say sharper images without motion effects. In general it is preferred to start from film (i.e 24 frame per second sequence) but regeneration from NTSC can be done if the original film stock has become lost or damaged. The recreation involves various weighting techniques to get the 24 frames from 30Hz video but this is beyond the scope of the present invention.

From the foregoing it will be seen that we have described a process that converts PAL standard 50Hz video, or film, to a format which is suitable for encoding in Green Book or White Book digital video, such as to allow simultaneous production of two output data files, one of which can be coded to produce a disc which plays on an NTSC player and the other a disc which plays on a PAL player. The process can satisfy the relevant restrictions implied by the White Book, Green Book and MPEG 1 or 2 standards and utilises the facilities in existing players to produce the desired output images without image distortion.

From reading the present disclosure, other modifications will be apparent to persons skilled in the art. Such modifications may involve other features which are already known in the design, manufacture and use of audio/visual standards conversion equipment and component parts thereof and which may be used instead of or in addition to features already described herein. Although claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

We claim:

1. Video signal processing apparatus having an input for receiving a sequence of digitised images from an image source, said apparatus comprising:

field grabber means coupled to receive digitised images from the input, and operable to identify separate fields thereof and output an image frame as lines of pixel data;

image manipulation means operable to selectively apply horizontal compression or expansion to reduce or increase the number of pixels per line and vertical compression to reduce the number of pixel lines in each image frame output by the field grabber, to numbers determined by a preselected display format;

video encoding means arranged to receive the compressed image frames from the image manipulation means and encode them according to a predetermined coding standard.

2. Apparatus as claimed in claim 1, in which, where the image source supplies an interlaced video signal, the field grabber means is operable to grab both fields and the image manipulation means is operable to perform field combination with sub-sampling to produce said compressed image frames at substantially half the video signal field rate.

3. Apparatus as claimed in claim 2, in which the image manipulation means is further operable to applying filtering when performing field combination such as to compensate for motion effects in the image fields.

4. Apparatus as claimed in claim 1, in which, where the image source comprises telecine apparatus supplying pairs of images from successive film frames, the field grabber means is operable to grab both fields and the image manipulation means is operable to perform field combination to produce said compressed image frames at or close to the display frame rate of said film.

5. Apparatus as claimed in claim 1, wherein said video encoding means is operable to select for encoding a part of each received compressed image frame.

6. Apparatus as claimed in claim 1, wherein said predetermined coding standard is the MPEG1 or 2 standard.

7. Apparatus as claimed in claim 1, further comprising disc building means connected to receive said encoded frames from the video encoding means and to arrange the data according to a predetermined recording format for recording onto optical disc.

8. Apparatus as claimed in claim 7, wherein said predetermined recording format complies with the Video Compact Disc standard.

9. Apparatus as claimed in claim 7, wherein said predetermined recording format complies with the Compact Disc Interactive standard.

10. A method of processing sequences of digitised images received from an image source, said method comprising the steps of:

grabbing the digitised images, identifying separate fields thereof and outputting an image frame as lines of pixel data;

selectively reducing or increasing the number of pixels per line and reducing the number of pixel lines in each image frame to numbers determined by a preselected display format, by respectively applying horizontal compression or expansion and vertical compression; and encoding the compressed image frames according to a predetermined coding standard.

11. A method as claimed in claim 10, wherein said predetermined coding standard is the MPEG1 or 2 standard.

12. A method as claimed in claim 10, wherein the preselected display format is NTSC standard and the compression reduces the image frame to 240 lines.

13. A method as claimed in claim 10, wherein the preselected display format is PAL standard and the compression reduces the image frame to 288 lines.

14. A method as claimed in claim 13, wherein 24 of the 288 lines are coded black.

15. A method as claimed in claim 10, further comprising the step of taking said encoded compressed frames and arranging the data according to a predetermined recording format for recording onto a record carrier.

16. A method as claimed in claim 15, wherein the record carrier is an optical disc and said predetermined recording format complies with the Video Compact Disc standard.

17. A method as claimed in claim 15, wherein the record carrier is an optical disc and said predetermined recording format complies with the Compact Disc Interactive standard.

18. An optical disc carrying encoded video images output from the video encoding means of the signal processing apparatus claimed in claim 1.

19. A data carrier carrying a sequence of video images encoded by a method of processing as claimed in claim 10.

* * * * *